United States Patent
Beniakar et al.

(10) Patent No.: US 11,316,463 B2
(45) Date of Patent: Apr. 26, 2022

(54) DOUBLE-STATOR PM MACHINE WITH 3RD ORDER CURRENT HARMONIC INJECTION

(71) Applicant: ABB Schweiz AG, Baden (CH)

(72) Inventors: Minos Beniakar, Athens (GR); Luca Peretti, Järfälla (SE); Panagiotis Kakosimos, Västerås (SE)

(73) Assignee: ABB Schweiz AG, Baden (CH)

( * ) Notice: Subject to any disclaimer, the term of this patent is extended or adjusted under 35 U.S.C. 154(b) by 161 days.

(21) Appl. No.: 16/737,691

(22) Filed: Jan. 8, 2020

(65) Prior Publication Data
US 2020/0228041 A1 Jul. 16, 2020

(30) Foreign Application Priority Data

Jan. 11, 2019 (EP) .................................... 19151342

(51) Int. Cl.
*H02P 25/22* (2006.01)
*H02K 11/33* (2016.01)
*H02K 3/28* (2006.01)
*H02K 16/04* (2006.01)

(52) U.S. Cl.
CPC .............. *H02P 25/22* (2013.01); *H02K 3/28* (2013.01); *H02K 11/33* (2016.01); *H02K 16/04* (2013.01)

(58) Field of Classification Search
CPC ........ H02P 25/22; H02P 25/098; H02P 25/02; H02P 6/18; H02K 11/33; H02K 3/28; H02K 16/04; H02K 27/22; H02K 1/2706
See application file for complete search history.

(56) References Cited

U.S. PATENT DOCUMENTS

| 6,710,495 B2 | 3/2004 | Lipo et al. |
| 8,319,464 B2 | 11/2012 | Hsu |
| 11,081,995 B2* | 8/2021 | Otake ..................... H02P 27/08 |
| 2003/0085627 A1* | 5/2003 | Lipo ..................... H02P 25/22 310/12.22 |

(Continued)

FOREIGN PATENT DOCUMENTS

| CN | 104795917 A | * | 7/2015 |
| CN | 104795917 A | | 7/2015 |

(Continued)

OTHER PUBLICATIONS

Extended European Search Report Application No. 19151342.3 Completed: May 24, 2019; dated Jun. 3, 2019 8 Pages.

*Primary Examiner* — Bickey Dhakal
(74) *Attorney, Agent, or Firm* — Whitmyer IP Group LLC

(57) ABSTRACT

A double-stator PM machine having: an outer stator generating an outer electromagnetic field dependent on an outer three-phase supply current; an inner stator generating an inner electromagnetic field dependent on an inner three-phase supply current; a PM rotor rotated by the outer and inner electromagnetic fields between the outer and inner stators; and a control arrangement controlling the outer and inner supply currents. There is an electrical connection between neutral points of the outer and inner stators. The control arrangement is configured for controlling the outer and inner supply currents such that there is a relative angle shift of 30° between the outer and inner supply currents and such that a third order current harmonic component is circulated between the outer and inner stators.

13 Claims, 3 Drawing Sheets

(56) References Cited

U.S. PATENT DOCUMENTS

| | | | | |
|---|---|---|---|---|
| 2003/0201686 A1* | 10/2003 | Narita | ............... | H02K 16/04 |
| | | | | 310/211 |
| 2009/0128076 A1* | 5/2009 | Taniguchi | ............... | B60L 1/003 |
| | | | | 318/400.41 |
| 2012/0074707 A1 | 3/2012 | Pedersen | | |
| 2014/0062375 A1* | 3/2014 | Suzuki | ............... | H02P 21/22 |
| | | | | 318/496 |

FOREIGN PATENT DOCUMENTS

| CN | 104935221 | A | | 9/2015 |
|---|---|---|---|---|
| CN | 105896856 | A | | 8/2016 |
| CN | 104935221 | B | * | 8/2017 |
| CN | 108964392 | A | | 12/2018 |
| JP | 2013074743 | A | | 4/2013 |
| WO | 2007117412 | A2 | | 10/2007 |
| WO | 2013047076 | A1 | | 4/2013 |

* cited by examiner (comparative example)

DOUBLE-STATOR PM MACHINE WITH 3RD ORDER CURRENT HARMONIC INJECTION

TECHNICAL FIELD

The present disclosure relates to a double-stator permanent magnet (PM) motor and to a method of control thereof.

BACKGROUND

Double-stator machines are generally known. For instance, WO 2007/117412 discloses an axial gap dynamo-electric machine that comprises first and second stators disposed coaxially with an intermediate rotor. The stators are selectively aligned with an axial offset between the positions of their respective teeth and slots.

SUMMARY

It is an objective of the present invention to provide a double-stator machine, e.g. a motor or generator, which can be controlled to give an increased torque.

According to an aspect of the present invention, there is provided a double-stator PM machine. The machine comprises an outer stator comprising an outer three-phase winding on an outer core, for generating an outer electromagnetic field dependent on an outer three-phase supply current supplied to the outer stator. The motor also comprises an inner stator positioned concentrically inside of the outer stator, the inner stator comprising an inner three-phase winding on an inner core, for generating an inner electromagnetic field dependent on an inner three-phase supply current supplied to the inner stator. The motor also comprises a PM rotor configured for being rotated by the outer and inner electromagnetic fields in a gap formed between the outer and inner stators. The motor also comprises a control arrangement for controlling the outer and inner supply currents, respectively. There is a relative mechanical shift corresponding to an electrical angle of 30° between the outer and inner stators. There is an electrical connection between a neutral point of the outer stator and a neutral point of the inner stator. The control arrangement is configured for controlling the outer and inner supply currents such that there is a relative angle shift of 30° between the outer and inner supply currents, corresponding to the relative mechanical shift. The control arrangement is also configured for controlling the supply currents such that a third order current harmonic component is circulated between the outer and inner stators.

According to another aspect of the present invention, there is provided a method of controlling such a double-stator PM machine. The method comprises the control arrangement controlling the outer and inner supply currents such that a third order current harmonic component is circulated between the outer and inner stators.

By virtue of the electrical connection between the neutral points, the third order harmonic component can be circulated in the stators, allowing the torque of the machine to be increased without the need to increase the maximum amplitude of the supply currents.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

In general, the double stator machine concept may be based on an electrical machine with two (instead of one) radial flux stator cores placed within each other (an outer and an inner one). In the airgap between these two stators rotates a rotor to produce torque, thus significantly increasing the torque and power density compared with standard single-stator machines. The injection of third current harmonics can lead to a torque density increase with reduced switching/inverter losses or decreased rating of the power electronic converters producing the supply currents to the stator windings.

Herein is introduced the control concept of harmonic current injection in the double stator control/drive system using two power electronic converters. The power electronic converters are able to produce third order current harmonic components in addition to the component of the fundamental frequency. The machine is treated as a dual three-phase winding machine, with the two windings having a common neutral to allow for third current harmonic circulation. Additionally, the proposed control can apply for any type of synchronous, asynchronous or reluctance rotor type of double stator type (for example, surface mounted, interior or spoke type permanent magnet, with flux barriers, linear motor etc.).

Figure 1A:
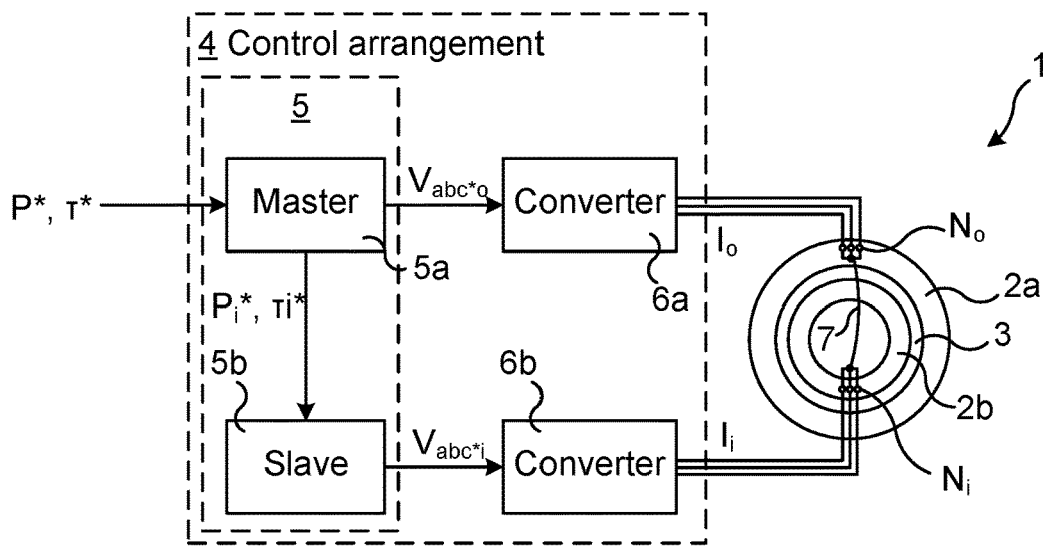
FIG. 1a is a schematic combined circuit and functional block diagram of a double-stator motor controlled by a current controller comprising a master controller and a slave controller, in accordance with some embodiments of the present invention.
Figure 1B:
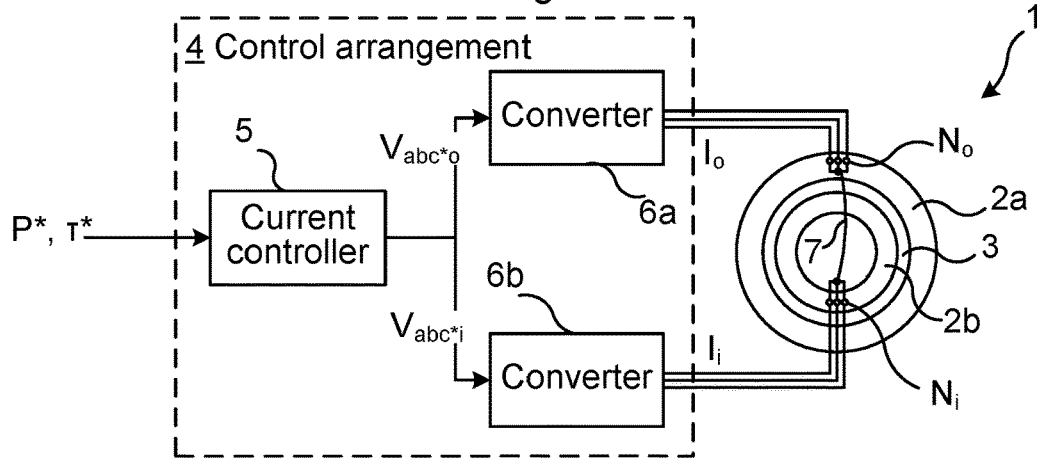
FIG. 1b is a schematic combined circuit and functional block diagram of a double-stator motor controlled by a current controller comprising a central controller, in accordance with some embodiments of the present invention.

FIGS. 1a and 1b illustrate different embodiments of a double-stator PM machine 1, here in the form of a motor. The motor 1 comprises an outer annular stator 2a comprising an outer three-phase winding on an outer core. Concentrically within the outer stator 2a is an inner annular stator 2b, forming an airgap between the outer and inner stators, in which gap a PM rotor 3 is positioned and allowed to be rotated by the electromagnetic fields produced by the stators when the motor is in use.

A neutral point No of the outer stator 2a is electrically connected with a neutral point Ni of the inner stator 2b by ways of an electrical connection 7. This connection 7 allows the third order current harmonic component to be circulated in the stators.

A three-phase outer supply current Io is provided to the three-phase winding of the outer stator 2a, the outer supply current comprising a fundamental component at fundamental frequency of the motor, and a third order current harmonic, at a frequency three times the fundamental frequency. Similarly, a three-phase inner supply current Ii is provided to the three-phase winding of the inner stator 2b, the inner supply current comprising a fundamental component at fundamental frequency of the motor, and a third order current harmonic, at a frequency three times the fundamental frequency. For instance, if the fundamental frequency is 50 Hz, the third order harmonic frequency is 150 Hz.

The supply currents Io and Ii may be produced by respective outer and inner power electronic converters 6a and 6b, operating as inverters, e.g. in the form of Modular Multilevel Converters (MMC). The supply currents Io and Ii are formed based on respective voltage references Vabc*o and Vabc*i for the three phases a, b and c of the supply current. The voltage references may typically be Pulse-Width Modulation (PWM) references. The voltage references may be produced, e.g. calculated, by a current controller 5 of the motor 1, based on at least one operation reference for the operation of the motor, e.g. including a power reference P* and/or a torque reference T*. Based on the at least one operation reference, e.g. P* and/or T*, the current controller 5 produces respective voltage references Vabc*o and Vabc*i for the outer and inner supply currents Io and Ii. The current controller 5, together with the converters 6a and 6b, are comprised in the control arrangement 4 of the motor 1.

In the embodiment of FIG. 1a, the current controller 5 comprises a master controller 5a and a slave controller 5b. In the figure, the master controller 5a is shown to be associated with the outer converter 6a while the slave controller 5b is associated with the inner converter 6b, but it could also be the other way around. The master controller 5a is responsible for the generation of the respective operation reference component (e.g. torque/power signals Pi*/Ti* for the inner stator) of the operation reference (e.g. P*and/or T*), for each stator, based on a pre-defined torque or power split strategy. The master controller 5a sends to the slave controller 5b the required information for performing a torque or current regulation of its associated converter 6b, for example an inner-stator power reference Pi* or an inner-stator torque reference τi*. After the split information is calculated and sent, the current regulation takes place in both the master and the slave controllers 5a and 5b and the voltage references Vabc*o, Vabc*i for the outer and inner stators are generated and sent to the respective converters 6a and 6b.

In the embodiment of FIG. 1b, a central controller 5 is used for generating the voltage references Vabc*o, Vabc*i of both the outer and the inner supply currents Io and Ii. Thus, also the torque and/or power split, the current regulations etc., are performed in the common control unit 5.

Figure 2A:
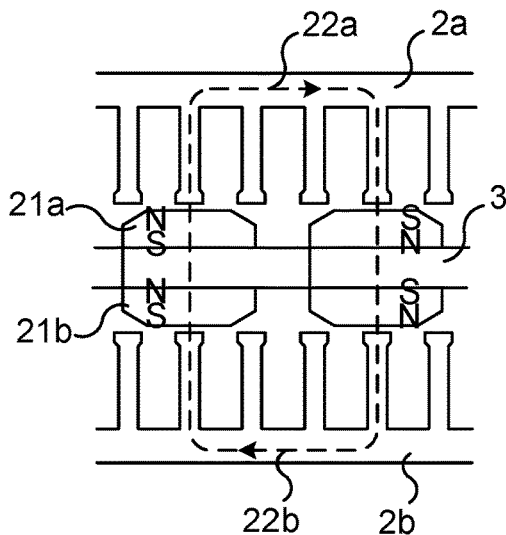
FIG. 2a is a schematic partial cross-section of a rotor between an outer and an inner stator, where the magnetic flux paths are in series with each other, in accordance with some embodiments of the present invention.
Figure 2B:
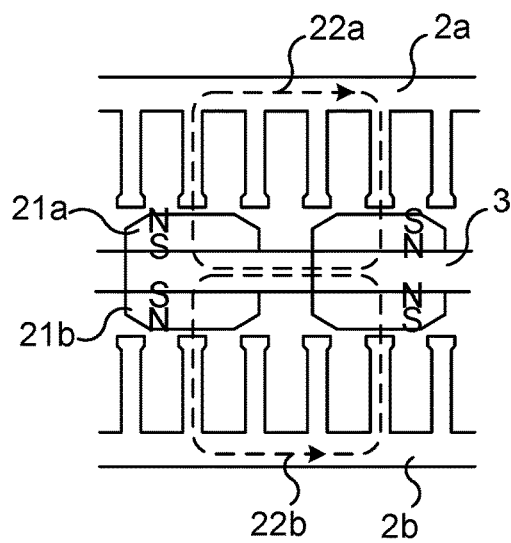
FIG. 2b is a schematic partial cross-section of a rotor between an outer and an inner stator, where the magnetic flux paths are in parallel with each other, in accordance with invention comparative example.

FIGS. 2a and 2b illustrate different embodiments of how magnetic flux paths 22 may be arranged via the stators 2a and 2b, and typically teeth thereof, and permanent magnets 21a and 21b of the rotor 3. In the examples of the figures, the rotor 3 comprises surface mounted outer permanent magnets 21a and surface mounted inner permanent magnets 21b, but any other conventional way of arranging a PM rotor may alternatively be used. North and South of the permanent magnets 21 are denoted "N" and "S", respectively. A magnetic flux path 22a passing through the outer stator 2a is schematically illustrated by a dashed line, as is a magnetic flux path 22b passing through the inner stator 2b. As can be seen, the outer and inner flux paths 22a and 22b may be in series, as shown in FIG. 2a, or in parallel, as shown in FIG. 2b.

A series-flux rotor configuration as in FIG. 2a is typically used with the present invention to allow for the magnetic coupling of the two stators 2a and 2b. In that sense, the respective rotor poles N/S corresponding to the inner and outer stators, respectively, maintain the same magnetization pattern. The flux paths for the series-flux and parallel-flux case are illustrated in FIGS. 2a and 2b, respectively. However, in the parallel case of FIG. 2b, the stators are not magnetically coupled and can thus operate independently, and a dual three-phase winding machine may not be possible to emulate in accordance with the present invention. The flux paths are determined by the orientation of the magnets 21 that correspond to the same pole for the respective stator 2a or 2b, the flow being from North to South through the stators.

The two stators are shifted by 30° electrical degrees, equal to half a slot-pitch mechanical shift. This shift is introduced also between the supply current vectors of the two stators. Due to this, the equivalent d-axes of the two stators are relatively shifted by about 30°, and as a result the optimum current angles to achieve Maximum Torque Per Ampere (MTPA) operation differ by approximately 30°.

In a special case, when the radius of the machine is approaching infinity, the machine may be regarded as a linear motor. The analysis of both cases may be the same. In case of a linear motor, the rotor may be called translator.

Figure 3A:
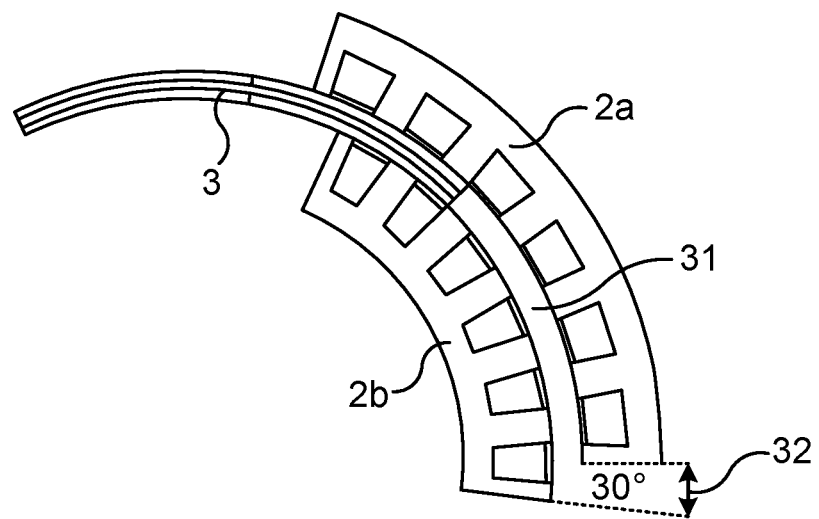
FIG. 3a is a schematic partial top view of a double-stator motor wherein the outer stator is shifted by 30° electrical degrees in relation to the inner stator, in accordance with some embodiments of the present invention.

FIG. 3a illustrates an example simplified geometry of a double stator machine 1 design with a PM rotor 3. As can be seen, the rotor 3 rotates in the gap 31 formed between the substantially concentrically arranged outer stator 2a and inner stator 2b. In practice, there will also be formed an outer airgap between the rotor 3 and the outer stator 2a and an inner airgap between the rotor 3 and the inner stator 2b, why such a double-stator motor 1 may also be called a double-airgap motor.

The relative electrical shift 32 between the two stators 2a and 2b impacts the model formulation in at least two ways: 1) it shifts the equivalent d-axis of the inner stator 2b by 30° electrical degrees and 2) consequently alters the MTPA map of the machine.

Figure 3B:
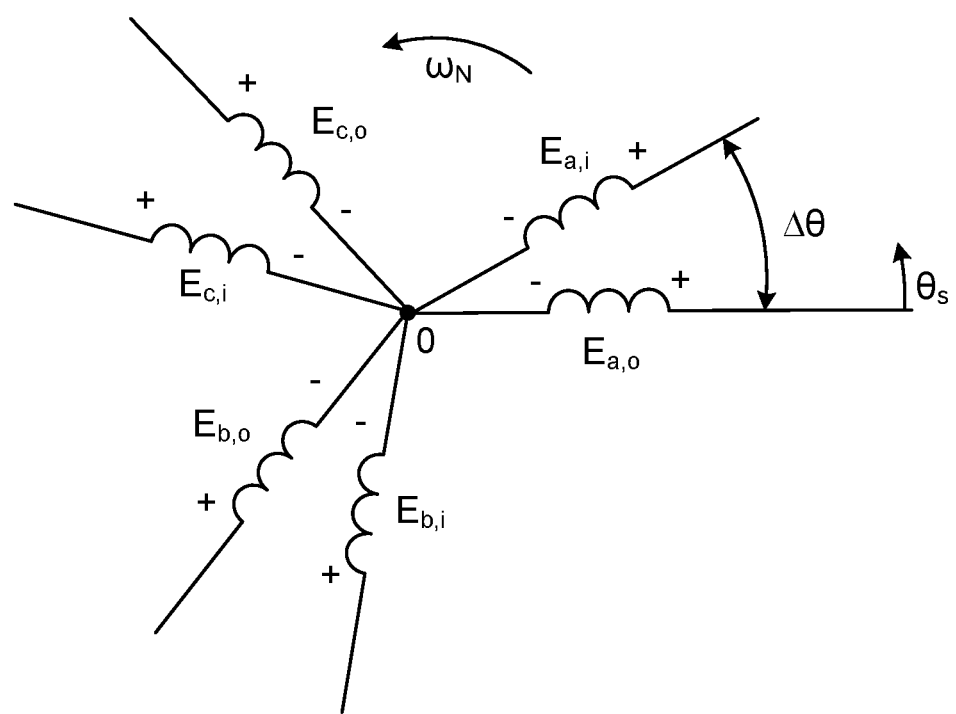
FIG. 3b is a schematic vector diagram showing the voltage reference frames for the outer and inner supply currents, giving an angular shift of 30° there between, in accordance with some embodiments of the present invention.

FIG. 3b illustrates the voltage reference frames for the outer and inner stators 2a and 2b, e.g. arranged in accordance with FIG. 3a. The subscripts a, b and c refer to the respective three phases of the supply current Io or Ii, while the subscripts o and i refer to the outer and inner stators, respectively. θs is the electrical angle and Δθ denotes the relative angle shift between the supply currents Io and Ii of each phase a, b and c.

Figure 4A:
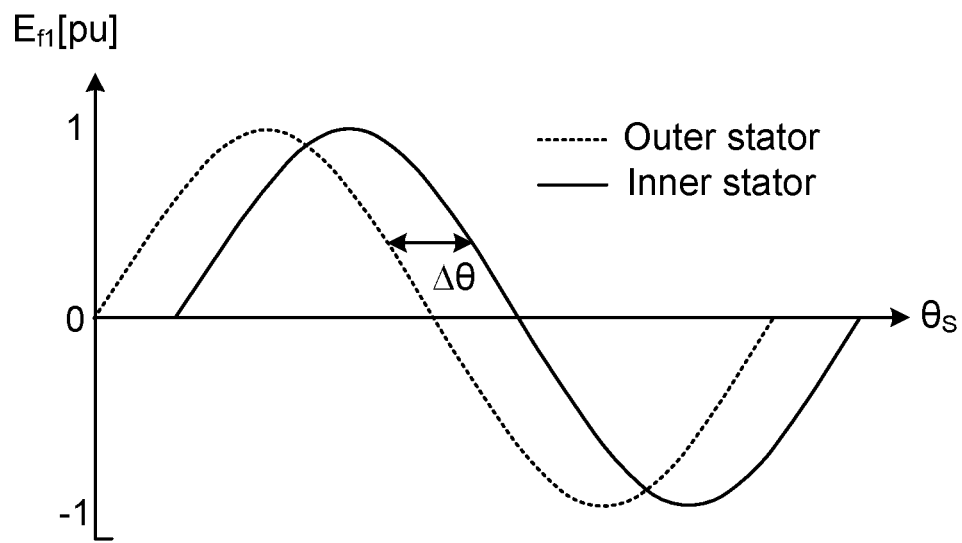
FIG. 4a is a schematic graph illustrating the respective fundamental frequency back-EMF of the outer and inner stators, and the electrical shift there between, in accordance with some embodiments of the present invention.

FIG. 4a illustrates example fundamental no-load back-EMF (Electromotive Force) waveforms on a per unit (pu) scale of a phase of the outer and inner stators 2a and 2b with a relative shift Δθ. There is thus a shift of the initial-position-dependent back-EMF waveform of the inner stator 2a. Additionally, due to the stator spatial angle difference, the maximum torque area will appear tilted within the torque map. The maximum torque will be exhibited for a current angle difference Δθ approximately equal to 30°.

In a dual three-phase machine 1, if a neutral point No/Ni is provided, the $3^{rd}$ order harmonic current can flow in the machine. There may be an aspect of the drive control that has to be taken into account, such as current synchronization and current control schemes with current unbalance compensation. However, these control issues have been analysed and implemented in dual three-phase machines. The sinusoidal or sinusoidal with $3^{rd}$ harmonic currents can be achieved with voltage pulse width modulations (PWM). The ideal current waveforms can be expressed as:

$$\begin{cases} I_{a,out} = I_m(\cos(p\omega_r t) + \alpha \cdot \cos(3 \cdot (p\omega_r t))) \\ I_{b,out} = I_m\left(\cos\left(p\omega_r t - \frac{2\pi}{3}\right) + \alpha \cdot \cos\left(3 \cdot \left(p\omega_r t - \frac{2\pi}{3}\right)\right)\right) \\ I_{c,out} = I_m\left(\cos\left(p\omega_r t + \frac{2\pi}{3}\right) + \alpha \cdot \cos\left(3 \cdot \left(p\omega_r t + \frac{2\pi}{3}\right)\right)\right) \\ I_{a,in} = I_m\left(\cos\left(p\omega_r t - \frac{\pi}{6}\right) + \alpha \cdot \cos\left(3 \cdot \left(p\omega_r t - \frac{\pi}{6}\right)\right)\right) \\ I_{b,in} = I_m\left(\cos\left(p\omega_r t - \frac{2\pi}{3} - \frac{\pi}{6}\right) + \alpha \cdot \cos\left(3 \cdot \left(p\omega_r t - \frac{2\pi}{3} - \frac{\pi}{6}\right)\right)\right) \\ I_{c,in} = I_m\left(\cos\left(p\omega_r t + \frac{2\pi}{3} - \frac{\pi}{6}\right) + \alpha \cdot \cos\left(3 \cdot \left(p\omega_r t + \frac{2\pi}{3} - \frac{\pi}{6}\right)\right)\right) \end{cases}$$

where the subscript "out" refers to the outer stator 2a and the subscript "in" refers to the inner stator 2b, and $I_3 = \alpha \cdot I_m$, wherein α is a coefficient that denotes the ratio of the respective amplitudes of the third harmonic current component $I_3$ to the fundamental current component $I_m$, p is the number of pole pairs, t is the time, and $\Omega_r$ is the angular speed of the rotor.

For the case of sinusoidal current supply α=0, while for the case of third harmonic injection |α|<1.

Figure 4B:
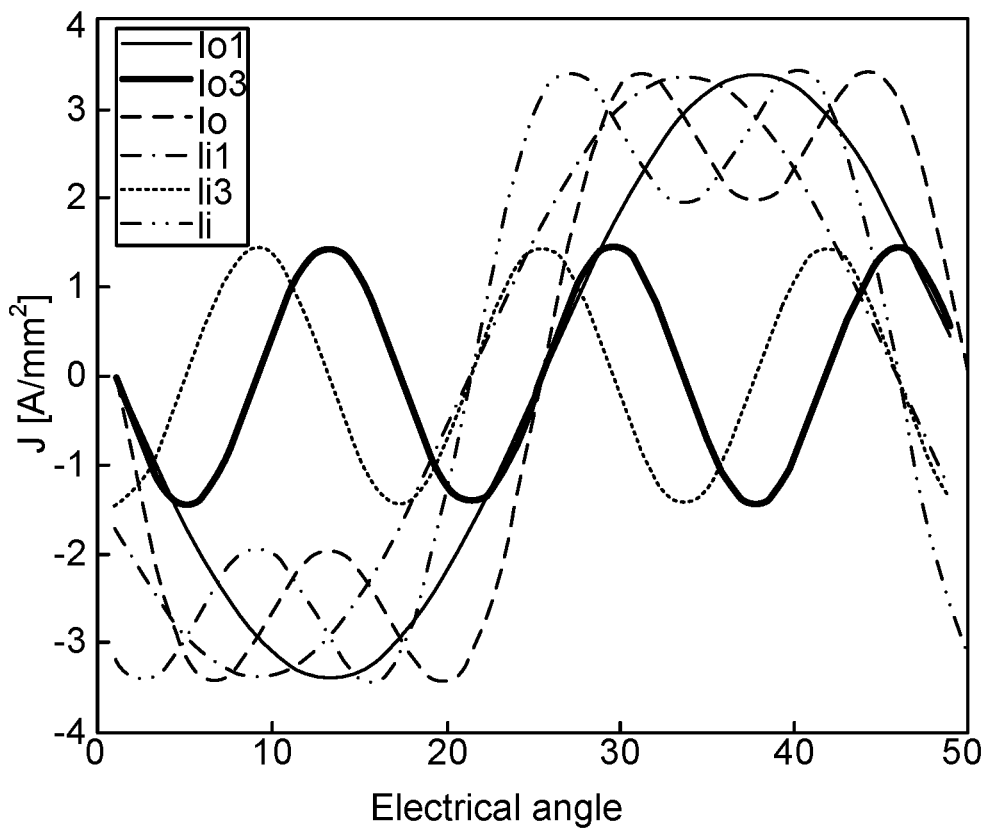
FIG. 4b is a schematic graph illustrating the respective fundamental frequency back-EMF, as well as injected third order current harmonics, of the outer and inner stators, and the electrical shifts there between, in accordance with some embodiments of the present invention.

FIG. 4b illustrates the current density waveforms, for a random current value based on the reference double stator machine design, where Io1 is the fundamental waveform component of the outer supply current Io, Io3 is the third order current harmonic component of the outer supply current Io, the outer supply current Io being a combination the two components, and where Ii1 is the fundamental waveform component of the inner supply current Ii, Ii3 is the third order current harmonic component of the inner supply current Ii, the inner supply current Ii being a combination the two components.

The ratio of third harmonic current to the fundamental one of either of the supply currents Io and Ii is a relevant parameter for the operation of the control system. Commonly used values may be:

A ratio equal to 0.43, which corresponds to the respective ratio of a square pulse waveform.

A ratio equal to 0.4, used in some literature for induction machines.

A ratio equal to the ratio of $3^{rd}$ harmonic back-EMF to the fundamental back-EMF.

Other.

The impact of the value of the third harmonic component of the back-EMF is emphasized here.

Typically, the ratio of third harmonic current to the fundamental one is the same for both supply currents Io and Ii (balanced operation). However, different ratios may also be used in some embodiments.

It is noted that the phase current amplitude is limited by the inverter component rating. Therefore, the third harmonic injection can be used in two ways: (a) to maintain the same peak current amplitude and increase the rms (root-mean-square) value and (b) to maintain the same rms value and reduce the peak current amplitude.

If the peak current amplitude of the machine 1, supplied with the sinusoidal plus third harmonic current is kept the same as for a current of only the fundamental sinusoidal waveform, the increased rms value of the supply current may affect the inverter losses (switching and conduction loss) and thus cooling requirements. This increase in rms current indicates that the inverter power density with a sinusoidal plus third harmonic current is improved compared to with a sinusoidal current. In addition, the sinusoidal together with third harmonic modulation may improve the modulation index by 14.4% compared with the sinusoidal modulation. This indicates that the machine 1 may not lead to an oversized rating of the power inverter or a higher DC bus voltage when the torque density is improved by injecting third harmonic current. However, the cooling requirement for the inverter may need to be improved due to the increase of the fundamental current combined with the third harmonic current, resulting in increased inverter losses.

On the other hand, when the machine 1 is supplied with the same rms current, the peak current amplitude is reduced, and this will decrease the power inverter VA (apparent power) rating by injecting third harmonic current with the same rms value current. Moreover, the switching losses (which may be proportional to the peak values of currents and voltages) might decrease, leading to a more efficient energy conversion process.

It is noted that the respective rating of the outer and inner stators 2a and 2b is not necessarily the same, which means that the amount of harmonic injection may be different in the two stator windings.

The invention may be used for large machines 1, e.g. in wind generators or marine propulsion motors, but can also be used for smaller electrical motors 1, e.g. in automotive traction applications and industrial machines. In wind power applications, the higher power density may lead to a smaller generator 1 and therefore a smaller nacelle size for a given power rating, which simplifies the mechanical tower and nacelle construction. In marine propulsion, a reduction in volume reduces the drag in the water.

A possible advantage of the double stator concept is the better fault tolerance with respect to inverter or one stator winding failure. Under these conditions it may be possible to continue the operation of the machine 1 at reduced power until service is available. This may be especially important for off-shore wind power or marine propulsion where a continuous operation is important and a quick service response is not always possible.

The partial load operation of the double stator concept may be superior compared to partial load conditions for single stator machines due to the possibility to share the power production by both stator cores and thus achieve better efficiency operation points for each stator 2a and 2b, which are possibly working closer to their respective operating points even if the whole machine 1 is working at partial load condition.

Additionally, combining the double stator technology with 3rd harmonic injection can potentially offer the following benefits:
  Additional torque density increase produced by the third harmonic component. This torque density increase can potentially come with no additional iron losses or deterioration of the saturation profile of the machine.
  Increased torque density with reduced inverter switching losses and/or reduced rating of the power inverters 6a and 6b.

Moreover, the same considerations as for third order harmonics discussed herein may apply also to fifth order harmonic current injection, especially if the back-EMF of the machine 1 exhibits such harmonics. Especially, a combination of $3^{rd}$ and $5^{th}$ order current harmonics may be used in some embodiments, e.g. if the back EMF contains $5^{th}$ order harmonics (this typically depends on each specific machine topology).

In some embodiments of the present invention, the control arrangement 4 comprises an outer power electronic converter 6a for outputting the outer supply current Io based on outer voltage references Vabc*o, and an inner power electronic converter 6b for outputting the inner supply current Ii based on inner voltage references Vabc*i.

In some embodiments of the present invention, the control arrangement comprises a current controller 5 for outputting the outer and inner voltage references based on at least one operation reference P* and/or τ* of the machine.

In some embodiments of the present invention, the current controller 5 comprises a master controller 5a and a slave controller 5b, corresponding to the embodiment of FIG. 1a. The master controller is for outputting one of the outer and inner voltage references to its power electronic converter and outputting a component of the at least one operation reference for the other of the outer and inner voltage references to the slave controller. The slave controller is for outputting the other of the outer and inner voltage references to its power electronic converter based on the component of the at least one operation reference.

In some embodiments of the present invention, the rotor 3 is provided with outer permanent magnets 21a facing the outer stator 2a and inner permanent magnets 21b facing the inner stator 2b.

In some embodiments of the present invention, paths 22a of magnetic flux through the outer stator are in series with paths 22b of magnetic flux through the inner stator.

In some embodiments of the present invention, the control arrangement 4 is further configured for controlling the outer and inner supply currents such that a fifth order current harmonic component is circulated between the outer and inner stators, i.e. a combination of 3rd and $5^{th}$ order harmonics is used.

In some embodiments of the present invention, the amplitude of the third order current harmonic component Io3 and/or Ii3 is within the range of 0.3-0.5 of the amplitude of a fundamental component Io1 and/or Ii1 of the outer and inner supply currents Io and/or Ii, e.g. 0.40 or 0.43.

An embodiment of the present invention relates more generally to a double-stator PM machine 1 comprising: an outer stator 2a generating an outer electromagnetic field dependent on an outer three-phase supply current Io; an inner stator 2b generating an inner electromagnetic field dependent on an inner three-phase supply current Ii; a PM rotor 3 rotated by the outer and inner electromagnetic fields between the outer and inner stators; and a control arrangement 4 controlling the outer and inner supply currents. There is an electrical connection 7 between neutral points No and Ni of the outer and inner stators. The control arrangement 4 is configured for controlling the outer and inner supply currents such that there is a relative angle shift Δθ of 30° between the outer and inner supply currents and such that a third order current harmonic component is circulated between the outer and inner stators.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:
1. A double-stator PM machine comprising:
   an outer stator having an outer three-phase winding on an outer core, configured to generate an outer electromagnetic field dependent on an outer three-phase supply current supplied to the outer stator;
   an inner stator positioned concentrically inside of the outer stator, the inner stator having an inner three-phase winding on an inner core, configured to generate an inner electromagnetic field dependent on an inner three-phase supply current supplied to the inner stator;
   a permanent magnet, PM, rotor configured to be rotated by the outer and inner electromagnetic fields in a gap formed between the outer and inner stators; and
   a control arrangement configured to control the outer and inner supply currents, respectively;
   wherein there is a relative mechanical shift corresponding to an electrical angle of 30° between the outer and inner stators;
   wherein there is an electrical connection between a neutral point of the outer stator and a neutral point of the inner stator;
   wherein the control arrangement is configured to control the outer and inner supply currents such that there is a relative angle shift of 30° between the outer and inner supply currents, corresponding to the relative mechanical shift, and such that a third order current harmonic component is circulated between the outer and inner stators; and wherein the rotor is provided with outer permanent magnets facing the outer stator and inner permanent magnets facing the inner stator.

2. The machine of claim 1, wherein the control arrangement comprises:
an outer power electronic converter configured to output the outer supply current based on outer voltage references; and
an inner power electronic converter configured to output the inner supply current based on inner voltage references.

3. The machine of claim 2, wherein the control arrangement comprises a current controller configured to output the outer and inner voltage references based on at least one operation reference of the machine.

4. The machine of claim 3, wherein the current controller comprises:
a master controller configured to output one of the outer and inner voltage references to the respective outer or inner power electronic converter and to output a component of the at least one operation reference for the other of the outer and inner voltage references to a slave controller,
the slave controller being configured to output the other of the outer and inner voltage references to the respective outer or inner power electronic converter based on the component of the at least one operation reference.

5. The machine of claim 2, wherein paths of magnetic flux through the outer stator are in series with paths of magnetic flux through the inner stator.

6. The machine of claim 2, wherein the control arrangement is further configured to control the outer and inner supply currents such that a fifth order current harmonic component is circulated between the outer and inner stators.

7. The machine of claim 1, wherein paths of magnetic flux through the outer stator are in series with paths of magnetic flux through the inner stator.

8. The machine of claim 1, wherein the control arrangement is further configured to control the outer and inner supply currents such that a fifth order current harmonic component is circulated between the outer and inner stators.

9. A method of controlling a double-stator PM machine, the machine comprising:
an outer stator having an outer three-phase winding on an outer core, generating an outer electromagnetic field dependent on an outer three-phase supply current supplied to the outer stator;
an inner stator having an inner three-phase winding on an inner core, positioned concentrically inside of the outer stator, generating an inner electromagnetic field dependent on an inner three-phase supply current supplied to the inner stator;
a permanent magnet, PM, rotor brought to rotate by the outer and inner electromagnetic fields in a gap formed between the outer and inner stators; and
a control arrangement controlling the outer and inner supply currents, respectively;
wherein there is a relative mechanical shift corresponding to an electrical angle of 30° between the outer and inner stators, and a corresponding relative angle shift between the outer and inner supply currents;
wherein there is an electrical connection between a neutral point of the outer stator and a neutral point of the inner stator;
wherein the rotor is provided with outer permanent magnets facing the outer stator and inner permanent magnets facing the inner stator;
the method including:
the control arrangement controlling the outer and inner supply currents such that a third order current harmonic component is circulated between the outer and inner stators.

10. The method of claim 9, wherein the amplitude of the third order current harmonic component is within the range of 0.3-0.5 of the amplitude of a fundamental component of the outer and/or inner supply current.

11. A double-stator PM machine comprising:
an outer stator having an outer three-phase winding on an outer core, configured to generate an outer electromagnetic field dependent on an outer three-phase supply current supplied to the outer stator;
an inner stator positioned concentrically inside of the outer stator, the inner stator having an inner three-phase winding on an inner core, configured to generate an inner electromagnetic field dependent on an inner three-phase supply current supplied to the inner stator;
a permanent magnet, PM, rotor configured to be rotated by the outer and inner electromagnetic fields in a gap formed between the outer and inner stators; and
a control arrangement configured to control the outer and inner supply currents, respectively;
wherein there is a relative mechanical shift corresponding to an electrical angle of 30° between the outer and inner stators;
wherein there is an electrical connection between a neutral point of the outer stator and a neutral point of the inner stator;
wherein the control arrangement is configured to control the outer and inner supply currents such that there is a relative angle shift of 30° between the outer and inner supply currents, corresponding to the relative mechanical shift, and such that a third order current harmonic component is circulated between the outer and inner stators;
wherein the control arrangement includes:
an outer power electronic converter configured to output the outer supply current based on outer voltage references;
an inner power electronic converter configured to output the inner supply current based on inner voltage references; and
a current controller configured to output the outer and inner voltage references based on at least one operation reference of the machine;
wherein the current controller includes a master controller configured to output one of the outer and inner voltage references to the respective outer or inner power electronic converter and to output a component of the at least one operation reference for the other of the outer and inner voltage references to a slave controller, the slave controller being configured to output the other of the outer and inner voltage references to the respective outer or inner power electronic converter based on the component of the at least one operation reference.

12. The machine of claim 11, wherein paths of magnetic flux through the outer stator are in series with paths of magnetic flux through the inner stator.

13. The machine of claim 11, wherein the control arrangement is further configured to control the outer and inner supply currents such that a fifth order current harmonic component is circulated between the outer and inner stators.

* * * * *